United States Patent
Kinkopf et al.

(10) Patent No.: US 7,874,515 B2
(45) Date of Patent: Jan. 25, 2011

(54) AIR VEHICLE PROPULSION SYSTEM ON GIMBALED TRUSS

(75) Inventors: Joseph W. Kinkopf, Chino, CA (US); David E. Carlile, Quartz Hill, CA (US); Alex Siler, Lancaster, CA (US); Andrew Yuhas, Lancaster, CA (US); Thomas H. Walsh, Quartz Hill, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 267 days.

(21) Appl. No.: 11/627,350

(22) Filed: Jan. 25, 2007

(65) Prior Publication Data

US 2008/0179452 A1 Jul. 31, 2008

(51) Int. Cl.
*B64D 27/00* (2006.01)
*B64B 1/30* (2006.01)
(52) U.S. Cl. ............... 244/56; 96/66; 96/51; 96/30
(58) Field of Classification Search ........... 244/56, 244/66, 26, 30, 54, 12.4, 23 A, 5, 7 C, 121, 244/25, 24, 127, 96, 51; 440/57; 248/554
See application file for complete search history.

(56) References Cited

U.S. PATENT DOCUMENTS

| | | | |
|---|---|---|---|
| 987,624 A | | 3/1911 | Hansen |
| 1,303,174 A | * | 5/1919 | De Stefano .............. 244/56 |
| 1,326,760 A | * | 12/1919 | Macinante ............... 440/57 |
| 1,601,062 A | * | 9/1926 | Dyer ........................ 248/554 |
| 1,657,955 A | | 1/1928 | Bylek |
| 1,726,062 A | | 8/1929 | Gilman |
| 1,842,125 A | | 1/1932 | Schwarz |
| 1,891,237 A | * | 12/1932 | Meyer ...................... 244/51 |
| 2,081,381 A | | 5/1937 | Oehmichen |
| 2,178,555 A | * | 11/1939 | Briggs ..................... 114/162 |
| 4,568,243 A | * | 2/1986 | Schubert et al. ........ 415/213.1 |
| 5,003,935 A | * | 4/1991 | Goldowsky ............. 123/54.2 |
| 5,294,076 A | * | 3/1994 | Colting .................... 244/96 |
| 5,383,627 A | * | 1/1995 | Bundo ...................... 244/30 |
| 5,425,515 A | * | 6/1995 | Hirose ....................... 244/5 |
| 5,690,035 A | * | 11/1997 | Hatayama et al. ........ 244/121 |
| 5,823,468 A | * | 10/1998 | Bothe ........................ 244/66 |
| 5,906,335 A | | 5/1999 | Thompson |
| 6,286,783 B1 | * | 9/2001 | Kuenkler .................. 244/30 |
| 6,471,159 B1 | * | 10/2002 | Bundo ....................... 244/26 |
| 6,708,920 B2 | * | 3/2004 | Fukuyama ................ 244/56 |

(Continued)

OTHER PUBLICATIONS

Dornheim, Michael, "Lockheed Martin's Secretly Built Airship Makes First Flight", Aviation Week's AviationNow, Feb. 5, 2006, pp. 1-2.

*Primary Examiner*—Tien Dinh
*Assistant Examiner*—Richard R. Green
(74) *Attorney, Agent, or Firm*—Koestner Bertani LLP; Mary Jo Bertani

(57) ABSTRACT

A gimbaled truss assembly is disclosed including a frame rotatably mounted in a gimbal mount, and a truss rotatably mounted within the frame. The truss is configured to retain a propulsion system. The frame and the truss rotate independently of one another. A fastening system for mounting the propulsion system to the truss includes vibration isolators. A plurality of braces are coupled to the gimbal mount. The braces conform to the external surface of an air vehicle on which the assembly is to be attached.

30 Claims, 14 Drawing Sheets

U.S. PATENT DOCUMENTS

| | | | | |
|---|---|---|---|---|
| 6,860,449 B1 * | 3/2005 | Chen | | 244/12.4 |
| 6,880,783 B2 * | 4/2005 | Munk | | 244/25 |
| 6,892,980 B2 * | 5/2005 | Kawai | | 244/56 |
| 6,976,899 B1 * | 12/2005 | Tamanas | | 446/178 |
| 7,040,572 B2 | 5/2006 | Munk | | |

* cited by examiner

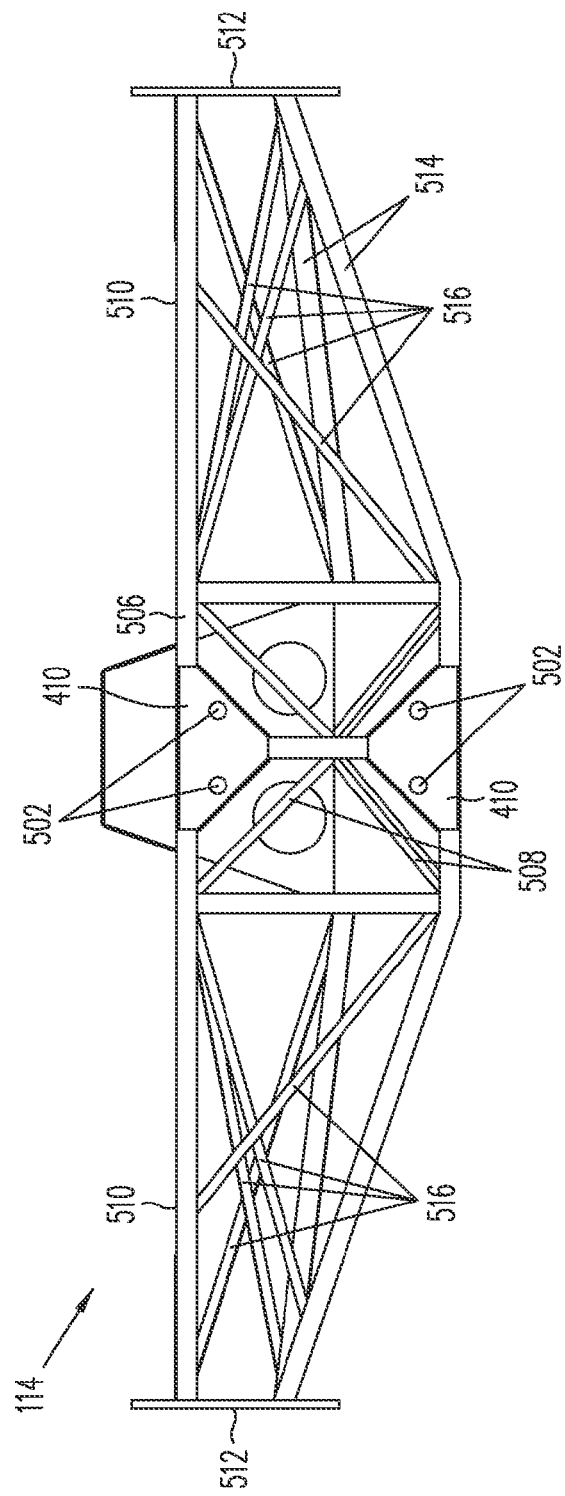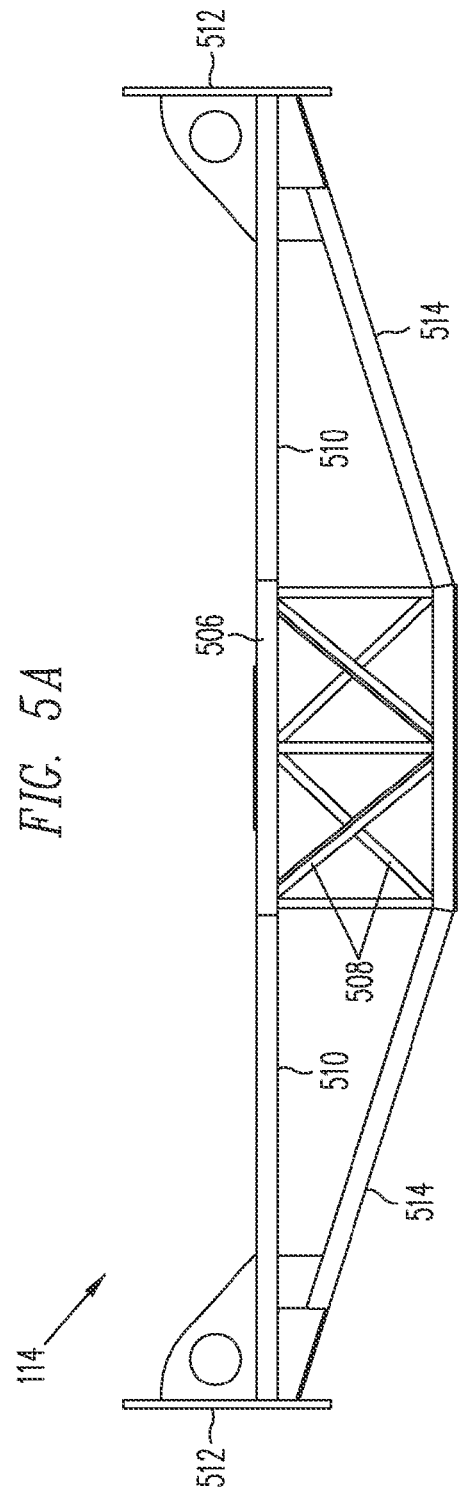

$\psi$ = vehicle heading
$\psi_v$ = velocity heading
$\psi_{vc}$ = velocity heading command
$\Delta\psi$ = command heading relative to vehicle
$\psi_w$ = wind heading (from)
$\beta$ = sideslip angle
$V_g$ = vehicle ground speed
$V_{gc}$ = vehicle ground speed command
$V_a$ = vehicle air speed
$V_w$ = wind speed
$R_g$ = control radius for *Ground Hold* mode

AIR VEHICLE PROPULSION SYSTEM ON GIMBALED TRUSS

BACKGROUND

Hybrid aircraft are currently under development that combine advantages of an aerodynamic shape with the cargo capacity, simplicity, and low operating costs of lighter-than-air vehicles. Uses for such vehicles include cargo transport, telecommunications platforms, surveillance, emergency response, advertising platforms, and tourism, among others.

Lighter-than-air vehicles are typically slow and difficult to maneuver. Yet, it is desirable to develop a hybrid aircraft capable of take off and landing in a minimum amount of space. It is also desirable to have maneuvering capability at low speeds, where aero surfaces are ineffective and to position the aircraft for loading and unloading. Additionally, maneuvering capability can be used to accurately navigate the aircraft along a desired course in windy conditions, as well as to help avoid obstacles and hazards during operation.

SUMMARY

In some embodiments, a gimbaled truss assembly is disclosed including a frame rotatably mounted in a gimbal mount, and a truss rotatably mounted within the frame. The truss is configured to retain a propulsion system. The frame and the truss rotate independently of one another. A fastening system for mounting the propulsion system to the truss includes vibration isolators. A plurality of braces are coupled to the gimbal mount. The braces conform to the external surface of an air vehicle on which the assembly is to be attached.

In another embodiment, a propulsion system mount assembly is disclosed that includes a gimbal mount, and a plurality of braces coupled to the gimbal mount. The braces are attachable to an external portion of an air vehicle. A first set of diametrically opposed brackets are included on the outer portion of a circular frame. A second set of diametrically opposed brackets are included on the inner portion of the circular frame. The circular frame is mounted to the gimbal mount at the first set of brackets to rotate approximately 180 degrees. A truss is configured to retain a propulsion system within the circular frame. The truss is rotatably mounted to the second set of brackets and the circular frame has a diameter large enough to allow the propulsion system and truss to rotate approximately 180 degrees through the circular frame.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

FIGS. 5A-5F show various views of an embodiment of the truss that can be utilized in the gimbaled truss assembly of FIGS. 1 and 2;

DETAILED DESCRIPTION

Embodiments of a gimbaled truss assembly for a hybrid aircraft are disclosed herein. The mounting assembly enables simultaneous propulsion and control of the air vehicle by using at least 180 degrees of vectored, differential thrust in pitch (nose up/down) and yaw (nose right/left) axes. The range of thrust vectoring provides a hemisphere of vectored propulsion and simultaneous control of the air vehicle without requiring forward movement of the vehicle. With thrust and control combined into one unit, no moveable control surfaces and potentially no tail are required for the air vehicle. If a tail is required, it can be less expensive, smaller, and lighter due to the contribution of the thrust vectoring propulsion systems and elimination of moveable control surfaces.

A hybrid air vehicle equipped with an air cushioned landing system offers considerable capability in terms of lifting capacity, operational flexibility and cost effectiveness. Such an air vehicle has the ability to operate from unimproved landing sites on both land and water. Along with the advantage of an extended operating range and landing location, the hybrid air vehicle also has handling characteristics more similar to a hovercraft than a traditional aircraft.

Figure 1:
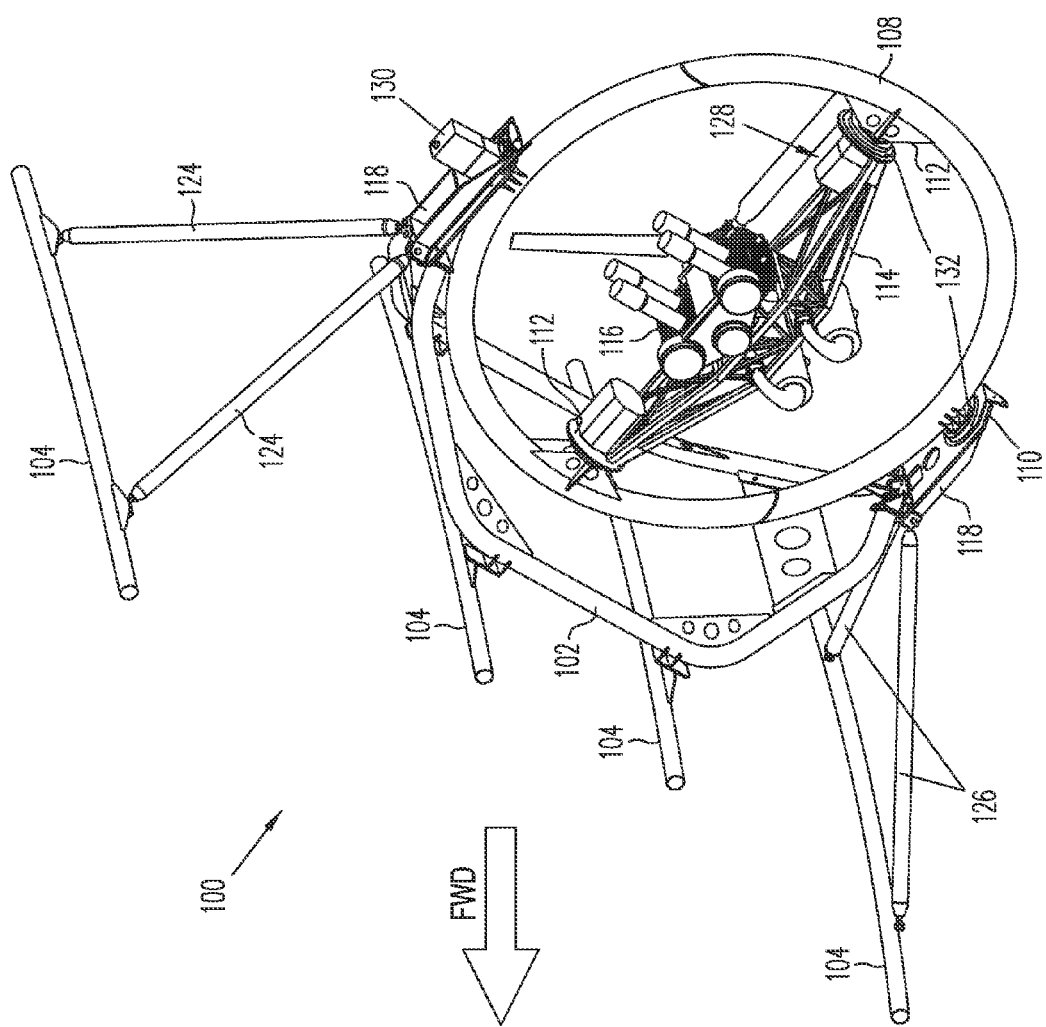
FIG. 1 is a perspective view of an embodiment of a gimbaled truss assembly attached to the side of an air vehicle.
Figure 2:
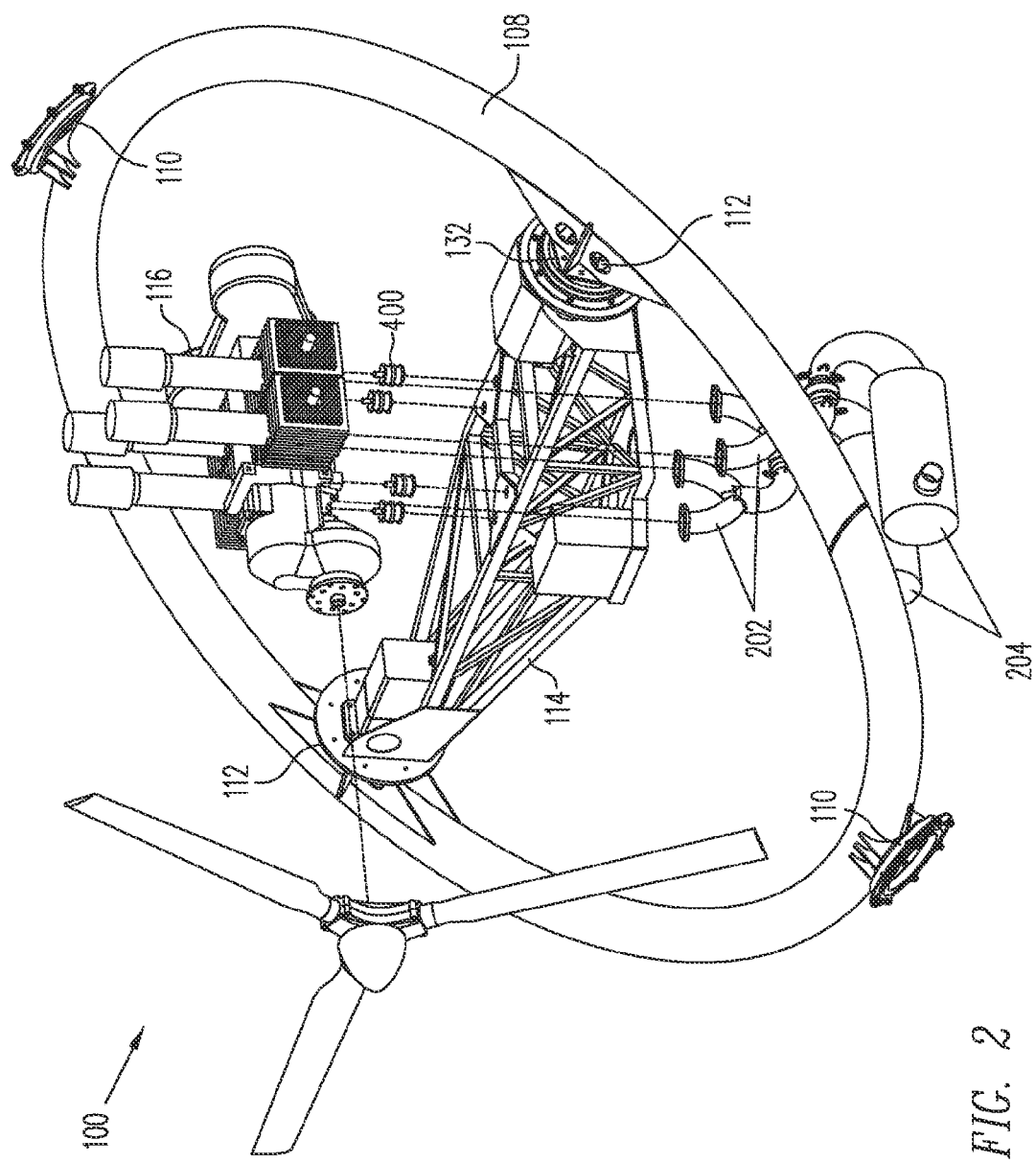
FIG. 2 is an exploded perspective view of the embodiment of the gimbaled truss assembly of FIG. 1.

Referring to FIGS. 1 and 2, perspective views of an embodiment of gimbaled truss assembly 100 is shown including gimbal mount 102 and a plurality of braces 104 coupled to gimbal mount 102. Braces 104 are attached to an external portion of an air vehicle (not shown). A first set of diametrically opposed brackets 110 are included on the outer portion of the circular frame 108. A second set of diametrically opposed brackets 112 are included on the inner portion of the circular frame 108.

Truss 114 is configured to retain a propulsion system 116 within circular frame 108. Truss 114 is rotatably mounted to the second set of brackets 112. Circular frame 108 has a diameter large enough to allow the propulsion system 116 and truss 114 to rotate at least 180 degrees through circular frame 108.

Figure 6:
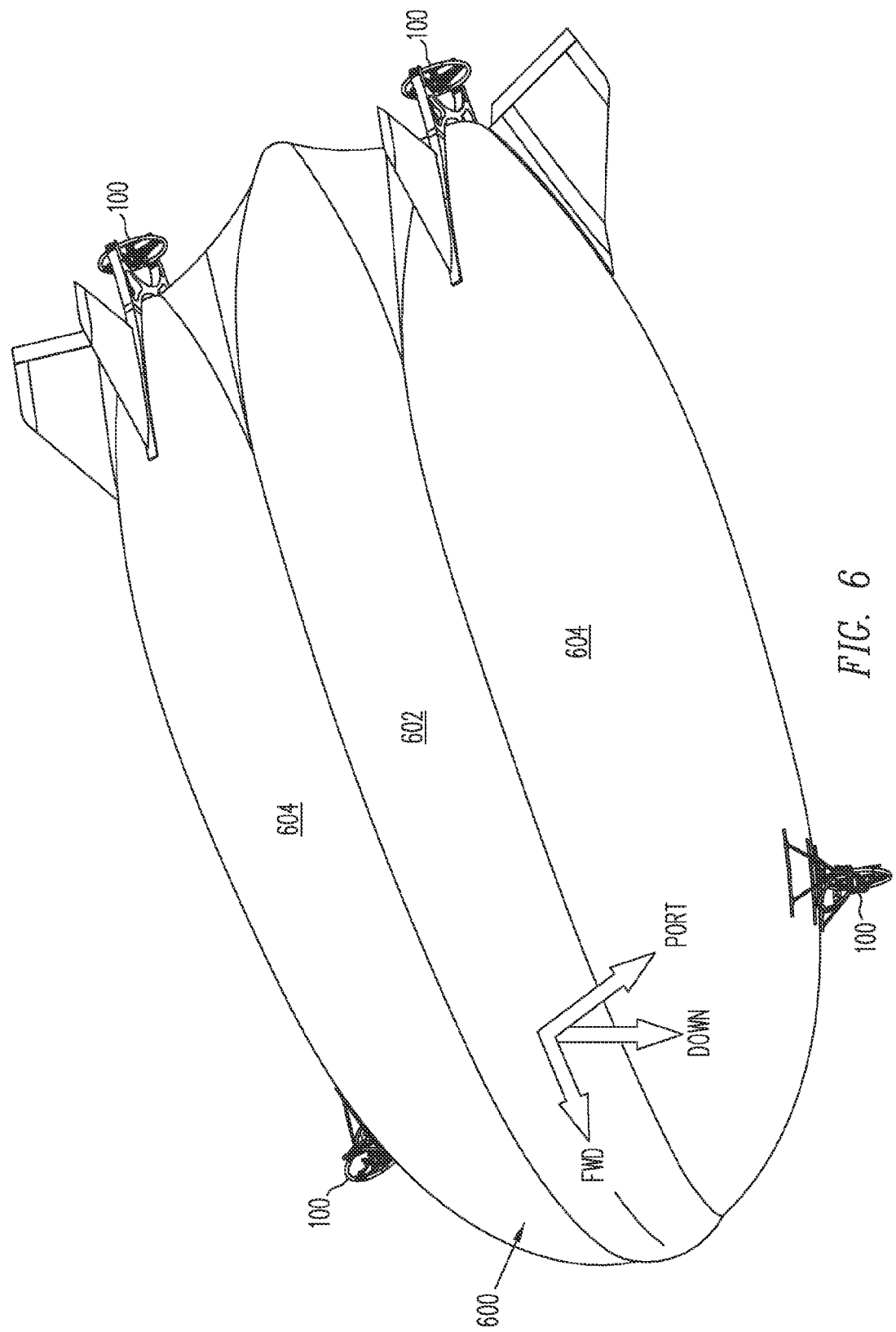
FIG. 6 is a perspective view of the upper side of a hybrid air vehicle including gimbaled truss assemblies of FIGS. 1 and 2 on port, starboard, and aft positions.

Gimbal mount 102 includes end brackets 118 configured to engage first set of brackets 110 of circular frame 108. Gimbal mount 102 is further configured to allow circular frame 108 to rotate at least 180 degrees within gimbal mount 102. A portion of gimbal mount 102 can be shaped to conform to the external surface of the air vehicle. For example, in the embodiment shown, gimbal mount 102 is C-shaped, and frame 108 is mounted at brackets 110 between end brackets 118. A center portion of mount 102 is flattened to conform to the shape of the air vehicle 600 (FIG. 6). One or more of braces 104 can be attached to the center portion of gimbal mount 102 and also typically conform to the outer contour of the air vehicle 600, depending on the length of brace(s) 104 and the shape of the air vehicle 600. Braces 104 are typically laced to the air vehicle, however, any suitable method can be used to fasten braces 104 to the air vehicle 600.

End bracket 118 of the C-shaped gimbal mount 102 can be configured to extend circular frame 108 some distance from the center of gravity of the air vehicle to achieve the desired propulsion system thrust moment arms to maneuver the air vehicle 600.

To stabilize mounting assembly 100, first set of arms 124 can be attached between one of the braces 104 and one of end bracket 118 of gimbal mount 102. Second set of arms 126 can be attached between another one of the braces 104 and another one of end brackets 118 of gimbal mount 102. Arms 124, 126 can be attached to form a triangular truss, with a corresponding one of the braces 104 forming the base of the triangle. The triangular truss helps distribute forces from propulsion system 116 along the corresponding brace 104 and the side of the air vehicle. Accordingly, in some embodiments, braces 104 are wider than gimbal mount 102 to provide a lever arm to counter the force/moments of propulsion system 116.

Pitch actuator 128 can be coupled to rotate truss 114 in response to command signals from an automated control system (not shown), and/or in response to a pilot's manual control input that is translated to a pitch angle command signal. Actuator 128 is typically configured to rotate approximately 180 degrees to allow propulsion system 116 to provide thrust in the up and down directions as well as intermediate directions. Note that although embodiments provided for example herein teach rotating truss 114 and circular frame 108 up to 180 degrees, truss 114 and circular frame 108 can be configured to rotate any desired number of degrees.

Yaw actuator 130 can be coupled to rotate circular frame 108 in response to command signals from an automated control system, and/or in response to a pilot's manual control input that is translated to a position command signal. Actuator 130 is typically configured to rotate approximately 180 degrees to allow propulsion system 116 to provide thrust in the fore and aft directions as well as intermediate directions.

Figure 3:
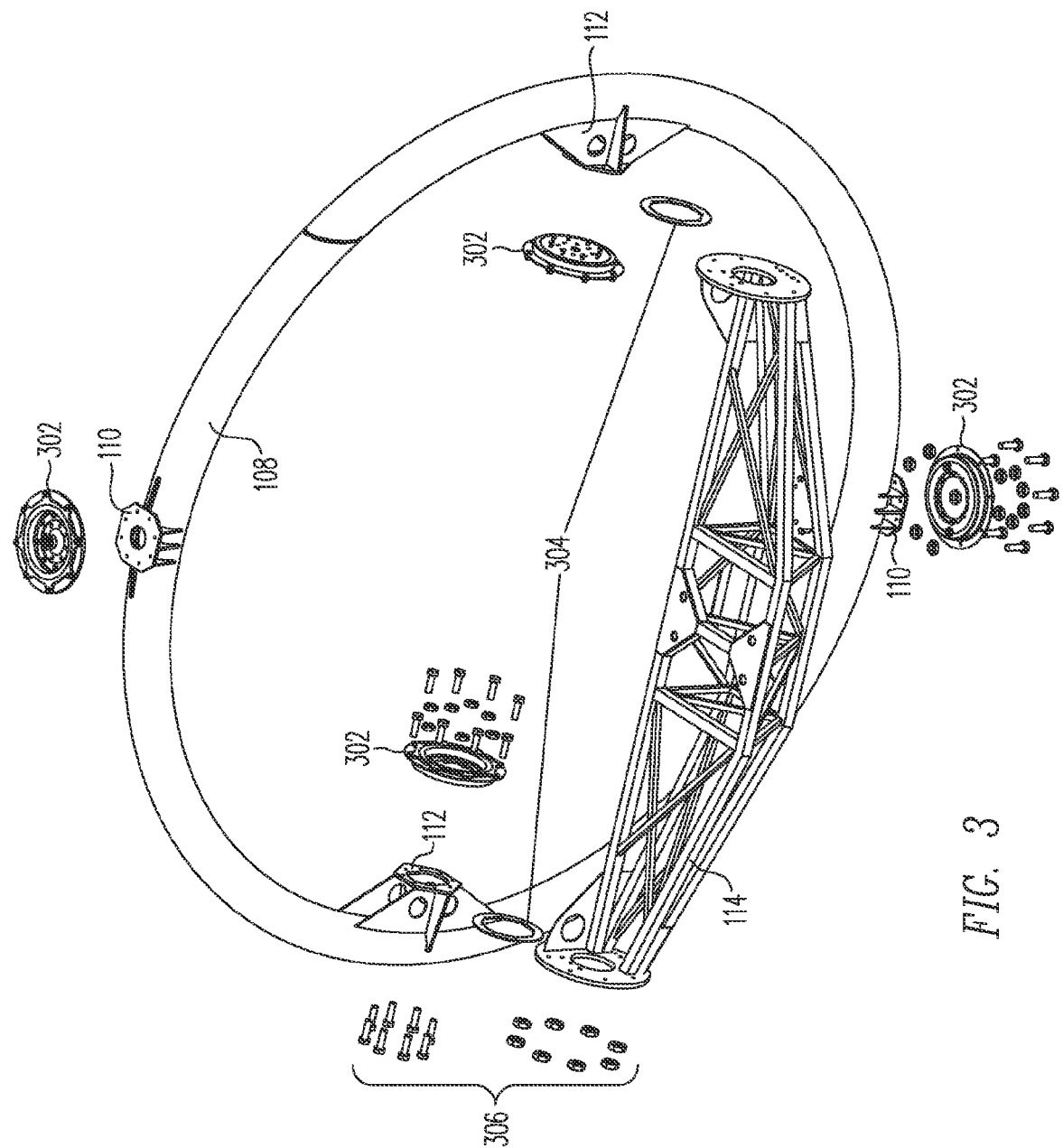
FIG. 3 is an exploded perspective view of an embodiment of a circular frame and gimbaled truss that can be utilized in the gimbaled truss assembly of FIGS. 1 and 2.

Referring to FIG. 3, an exploded perspective view of an embodiment of circular frame 108 and gimbaled truss 114 is shown that can be utilized in the gimbaled truss assembly of FIGS. 1 and 2. Bearing assemblies 302 can be coupled between ends of truss 114 and first set of brackets 112 to facilitate rotational motion of truss 114. Bearing assemblies 302 can also be coupled between diagonally opposite portions of circular frame 108 and second set of brackets 110 to facilitate rotational motion of circular frame 108. Truss 114 can be mounted to frame 108 using shims 304 between brackets 112 and bearing assemblies 302. Suitable fasteners such as nuts and bolts 306 can be used to fasten truss 114 to bearing assemblies 302 and bearing assemblies 302 to brackets 112.

Referring again to FIG. 2, exhaust manifolds 202 can be coupled to propulsion system 116. In the embodiment shown, propulsion system 116 is coupled to one side of truss 114, with truss 114 positioned between propulsion system 116 and at least a portion of exhaust manifolds 202. Propulsion system 116 can be mounted to truss 114 using any suitable type of fastener(s). For example, FIG. 4A shows an exploded view of an embodiment of fastening system 400 for mounting the propulsion system to the truss that can be utilized in the gimbaled truss assembly 100 of FIGS. 1 and 2. Fastening system 400 includes, in order starting next to propulsion system 116, snubbing washer 404, two-piece vibration isolator 406, washer 408, truss interface plate 410, and another snubbing washer 404, mounted on hex bolt 412. Hex bolt 412 engages a threaded opening in propulsion system 402. Truss interface plate 410 is typically welded to a portion of truss 114 that is sandwiched between the two portions of vibration isolator 406. The hex bolt 412 engages vibration isolator 406 and screws into a portion 402 of propulsion system 116. Also, the exhaust manifolds 202 can be bolted directly to propulsion system 116 and strapped to truss 114.

Figure 4C:
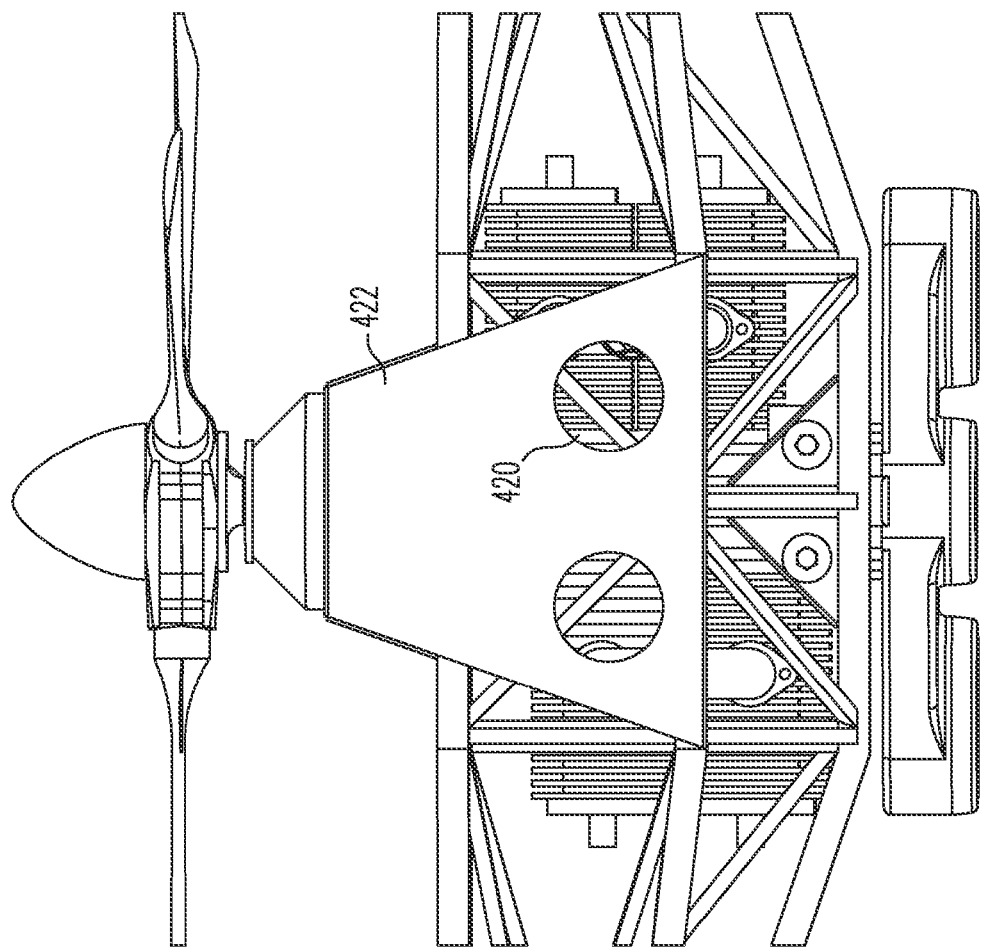
FIGS. 4B-4F show various views of an embodiment of the truss mounted to the circular frame that can be utilized in the gimbaled truss assembly of FIGS. 1 and 2.
Figure 4A:
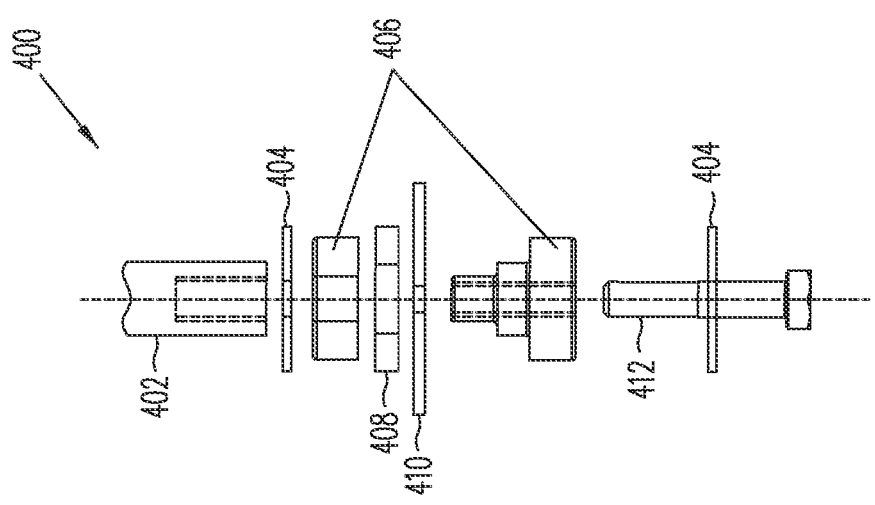
FIG. 4A is an exploded view of an embodiment of a fastening system for mounting a propulsion system to the truss that can be utilized in the gimbaled truss assembly of FIGS. 1 and 2.
Figure 4B:
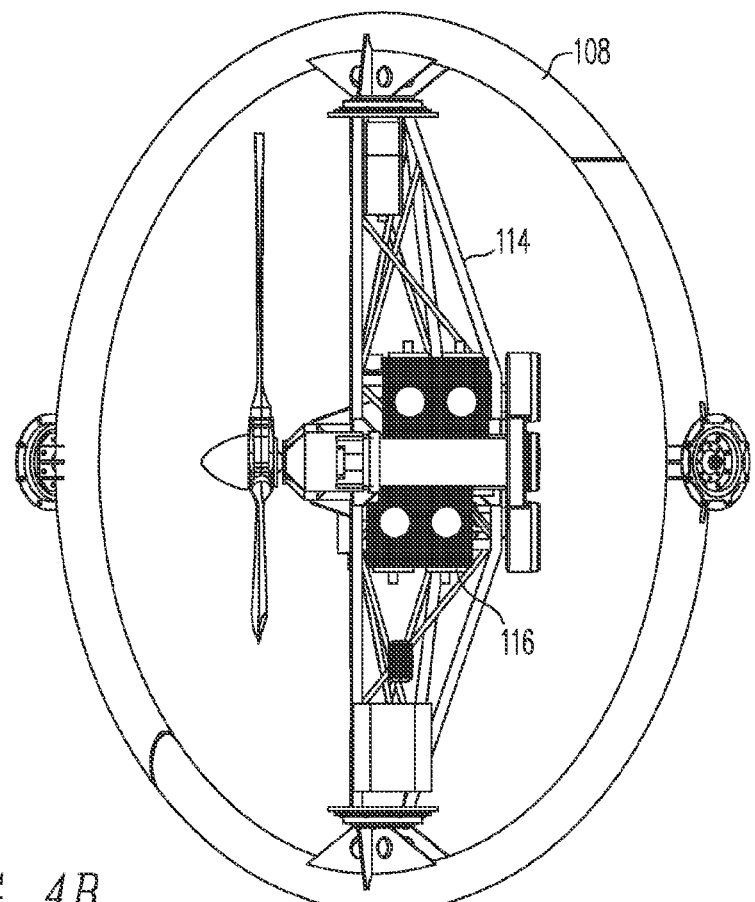

FIGS. 4B-4E show various views of truss 114 mounted to circular frame 108 that can be utilized in the gimbaled truss assembly 100 of FIGS. 1 and 2. FIG. 4B shows a top view of propulsion system 116 mounted on truss 114. FIG. 4C shows cross-sectional view B-B of FIG. 4D indicating holes 420 in plate 422 on one side of truss 114 to lighten the structure.

Figure 4D:
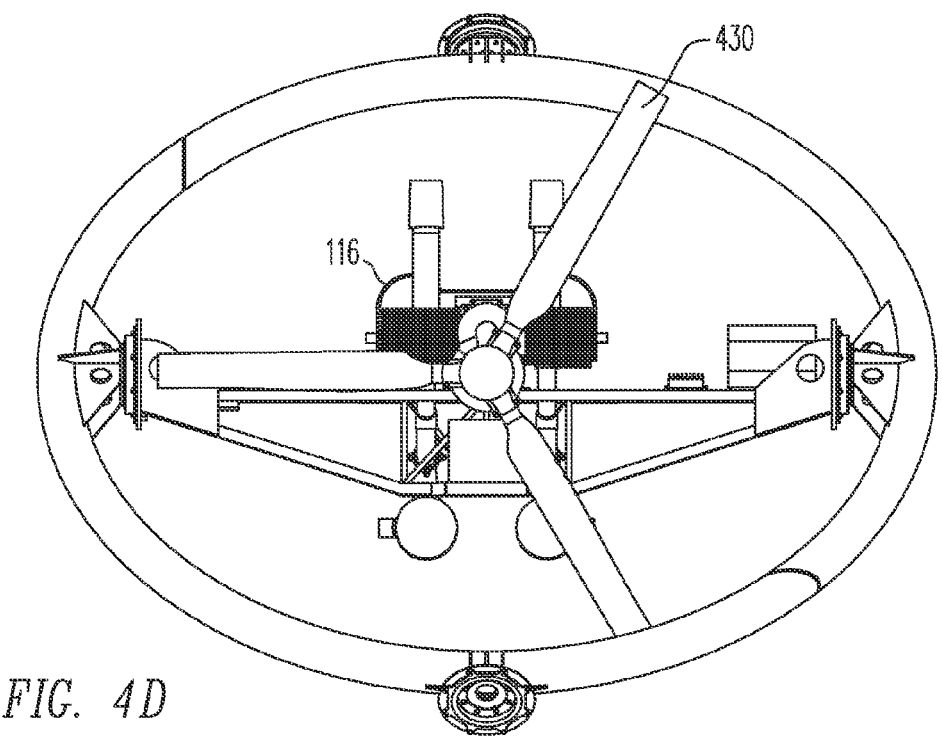

FIG. 4D shows a rear view of an embodiment of propulsion system 116 mounted on truss 114 to allow exhaust manifolds 202 (FIG. 2) to be coupled to propulsion system 116. Propulsion system 116 is shown including propeller 430, but any suitable propulsion system or combination of propulsion systems can be used.

Figure 4E:
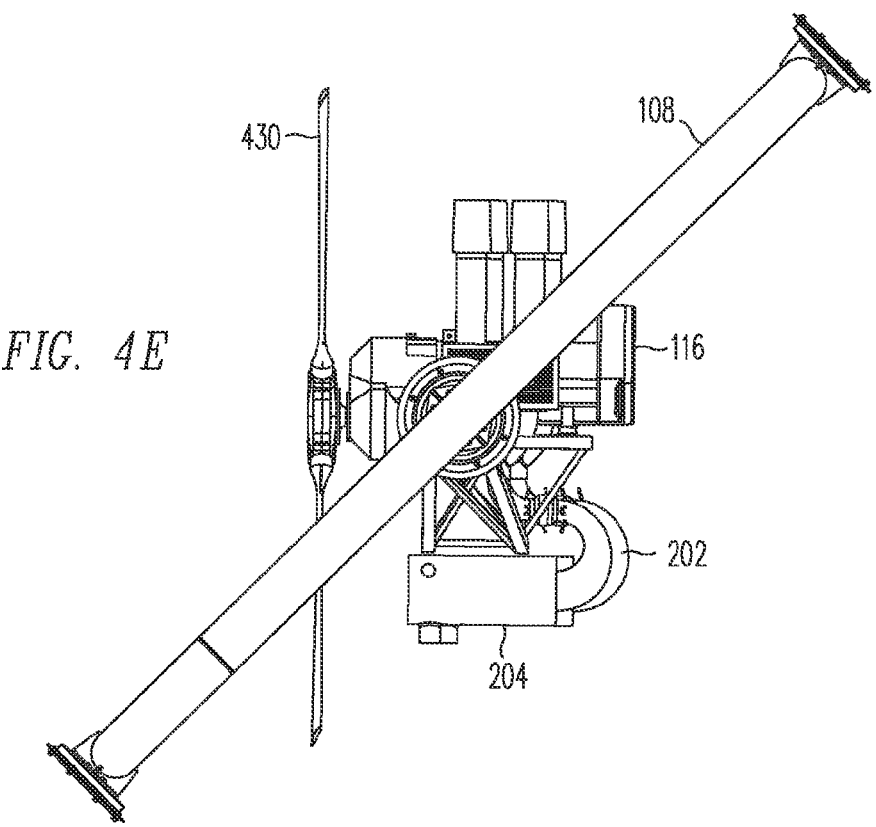
Figure 4F:
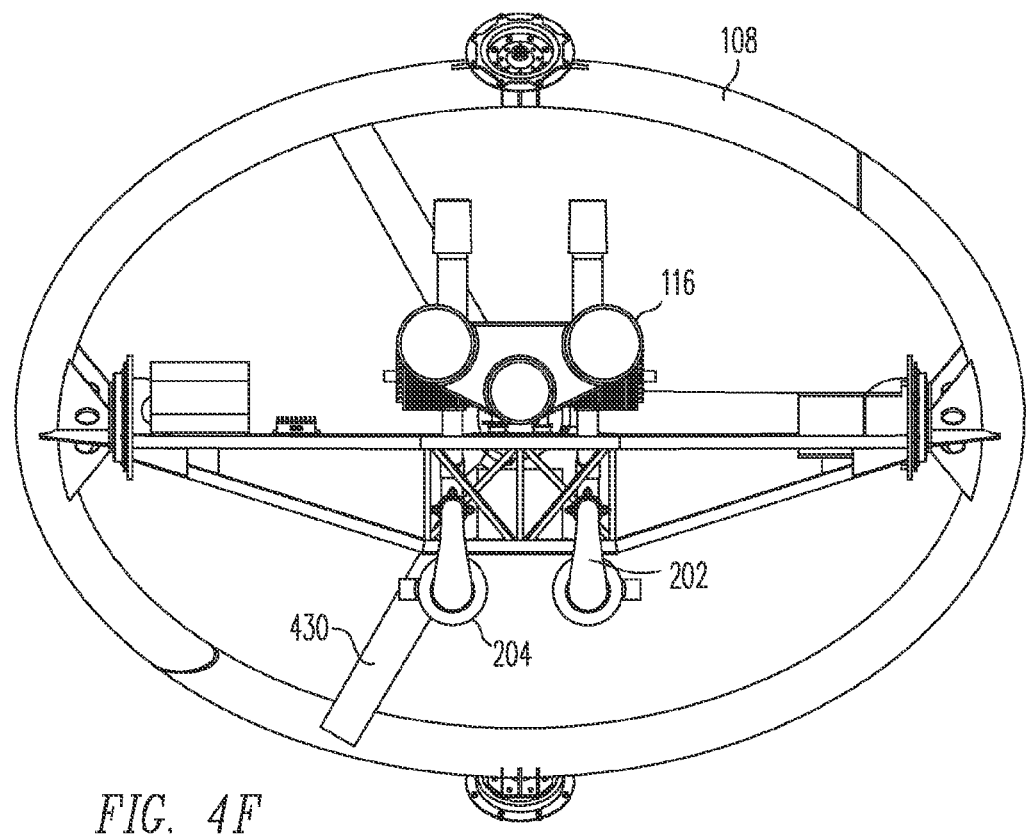

FIGS. 4E and 4F show respective side and front views of propulsion system 116 mounted to one side truss 114 within circular frame 108. Mufflers 204 are shown mounted on another side of truss 114, with manifolds 202 connecting mufflers 204 to the exhaust ports of propulsion system 116. Note that the diameter of propeller 430 to allow propulsion system 116 and truss 114 to rotate completely through circular frame 108.

FIGS. 5A-5F show top, front, perspective, side, bottom, and rear views, respectively, of an embodiment of truss 114 that can be utilized in gimbaled truss assembly 100 of FIGS. 1 and 2. Referring to top view of truss 114 in FIG. 5A, truss 114 includes a plurality of openings 502 configured to accommodate a plurality of fastening systems 400 (FIG. 4A) to mount a propulsion system 116 (not shown) in the center of one side of truss 114. Truss 114 can include one or more truss interface plates 410 with openings 502 to provide a stable platform for the propulsion system. Note that other suitable fasteners or other devices for mounting a propulsion system on truss 114 can be used.

The embodiment of truss 114 shown in FIGS. 5A-5F includes a central three-dimensional rectangular framework 506 with crisscrossed braces 508 to add stiffness and strength. Three-dimensional elongated trapezoidal frameworks 510 are configured on two opposing sides of central framework 506. Frameworks 510 include a straight member coupled to a respective circular end portion 512 and three angled members 514 coupled to respective circular end portion 512. The angled members cause frameworks 510 to taper toward circular end portions 512. Cross braces 516 can be included in frameworks 510 to add further strength and stiffness to truss 114. End portions 512 can be configured with openings or other suitable structure for mounting truss 114 to bearing assembly 302 (FIG. 3).

Figures 5C, 5D:
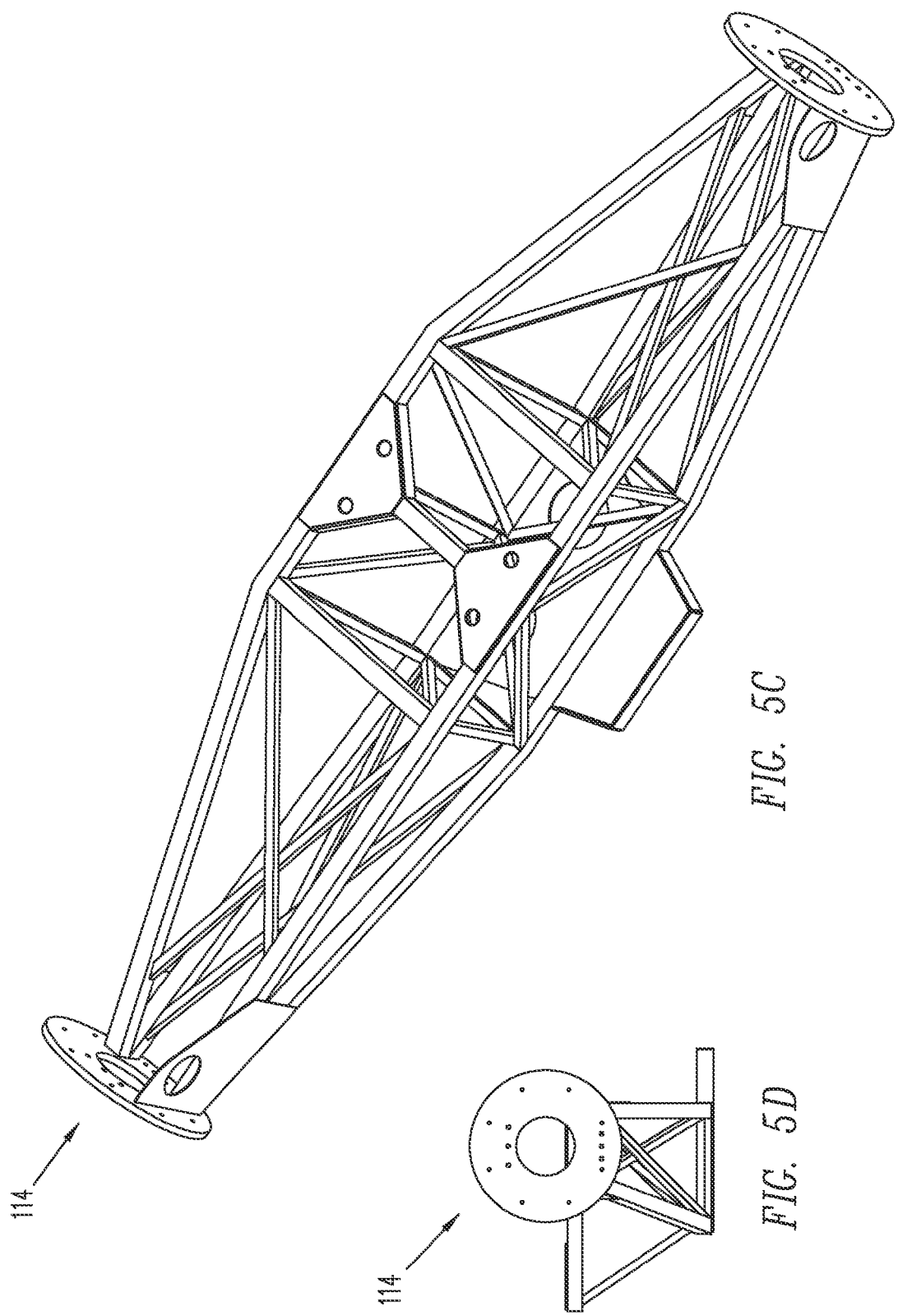
Figure 5E:
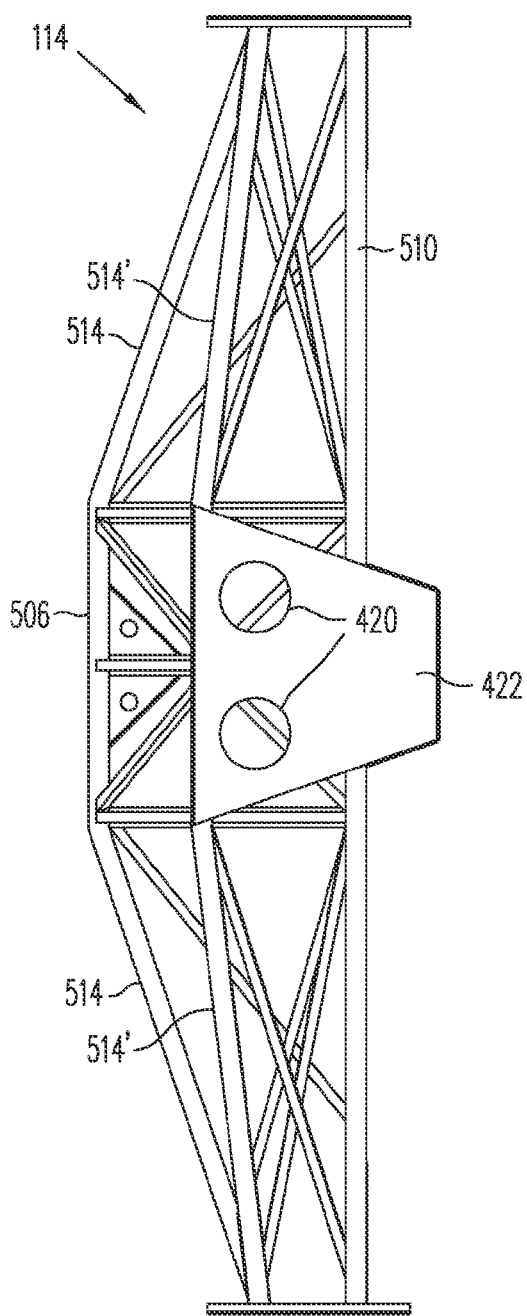

Referring to FIG. 5E, the bottom of truss 114 can include a plate 422 to stiffen the structure and provide a place to mount the mufflers. Openings 420 can be included in plate 422 to lighten the structure. Additionally, the top and bottom angled members 514, 514' of truss 114 can be staggered to reduce the weight of the structure, with the top members 514 extending past bottom members 514'.

Figure 5F:
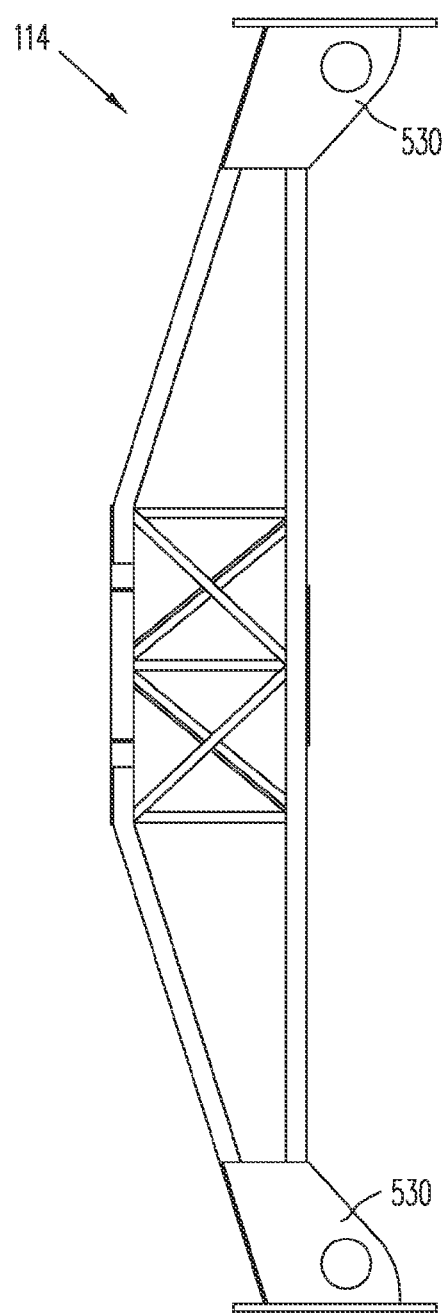

Referring to FIG. 5F, the bottom of truss 114 can include plates 530 near end portions 512 to stiffen the structure. Openings can be included in plates 530 to lighten the structure.

FIG. 6 is a perspective view of an embodiment of the top side of hybrid air vehicle 600 including gimbaled truss assemblies 100 of FIGS. 1 and 2 on port, starboard, and aft positions of vehicle 600. In the embodiment shown, air vehicle 600 has a center gas-filled lobe 602 joined longitudinally along a portion of gas-filled side lobes 604. The aerodynamic shape of lobes 602, 604 of air vehicle 600 generates lift. Additional lift is provided by a buoyant gas, such as helium, contained in lobes 602, 604.

The outer surface of air vehicle 600 can be fabricated of a non-rigid sheet material, including composite and/or laminated fabric material. Lobes 602, 604 are typically pressurized, thereby eliminating the need for internal structure or bracing. Such a design provides a vehicle 600 with resilient external surfaces that is low cost and low weight. The relatively low height to length profile of lobes 602, 604 provide improved stability and ground handling compared to conventional lighter-than-air vehicles of equal gas volume.

Figure 7:
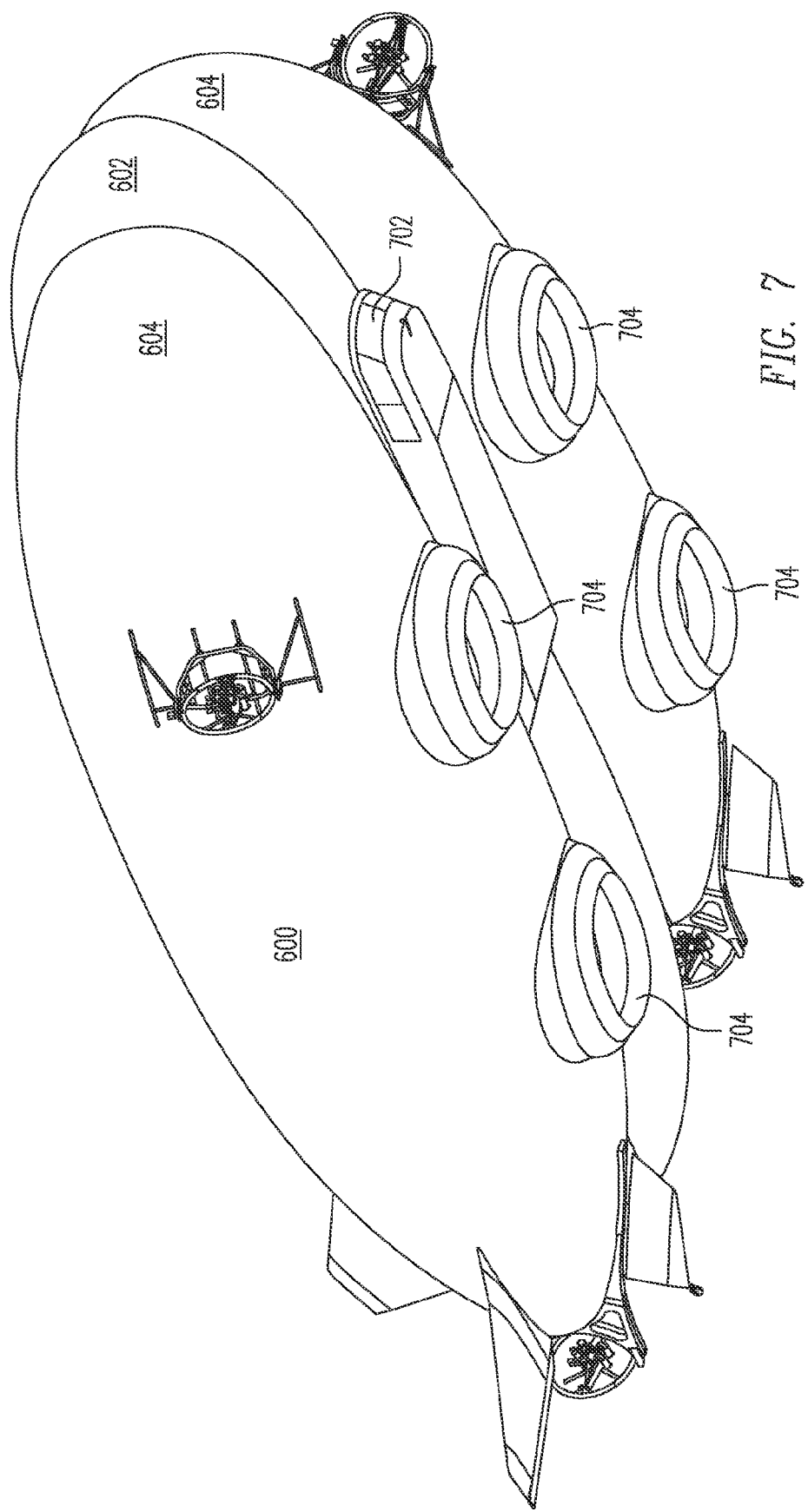
FIG. 7 is a perspective view of the lower side of a hybrid air vehicle including gimbaled truss assemblies of FIGS. 1 and 2 on port and starboard positions.
Figure 8:
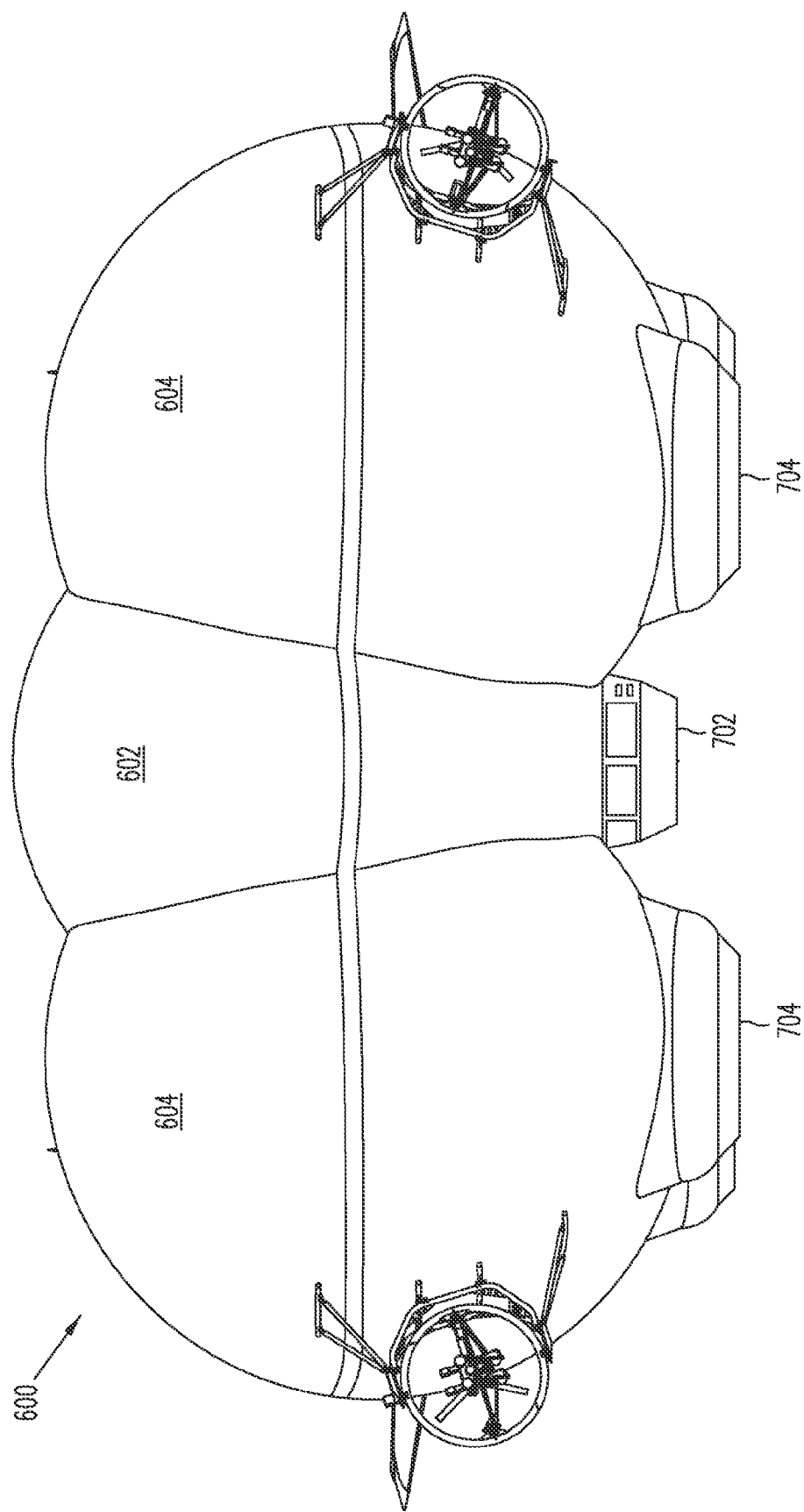
FIG. 8 is a front view of the hybrid air vehicle including gimbaled truss assemblies of FIGS. 1 and 2 on port and starboard positions.

FIG. 7 is a perspective view of the lower side of a hybrid air vehicle 600 including gimbaled truss assemblies 100 of FIGS. 1 and 2 on port and starboard positions. Gondola 702 is attached to center lobe 602 in a longitudinal recess formed by side lobes 604 being positioned slightly lower than center lobe 602. FIG. 8 shows a front view of air vehicle 600 and the vertical position of center lobe 602 relative to side lobes 604. Gondola 702 and/or lobes 602, 604 can be configured to carry passengers, cargo, on-board computers, instruments, sensors, equipment, and other suitable items/systems.

Air cushion landing systems 704 are positioned in spaced relation on the underside of side lobes 604. The embodiment shown includes two landing systems 704 on the bottom of each side lobe 604. Landing systems 704 are positioned fore and aft of the center of gravity of air vehicle 600 to improve the stability and handling of air vehicle 600 during take off, landing, and taxi. Air cushion landing systems 704 enable air vehicle 600 to be lowered to the ground gently. Gondola 702 can be positioned to enable cargo to be easily off-loaded from a ramp (not shown). Air cushion landing system 704 further enables air vehicle 600 to take-off and land in relatively small areas and can be used on landing surfaces that are relatively uneven compared to conventional runways. Further, air vehicle 600 can take-off and land on liquid and solid surfaces.

Air cushion landing system 704 can exhaust air to create suction on the landing surface, thereby providing a stable platform for loading and unloading without the aid of ground crews and tie-down systems. In some embodiments, landing system 704 can be retracted during flight to reduce aerodynamic drag.

Figure 9:
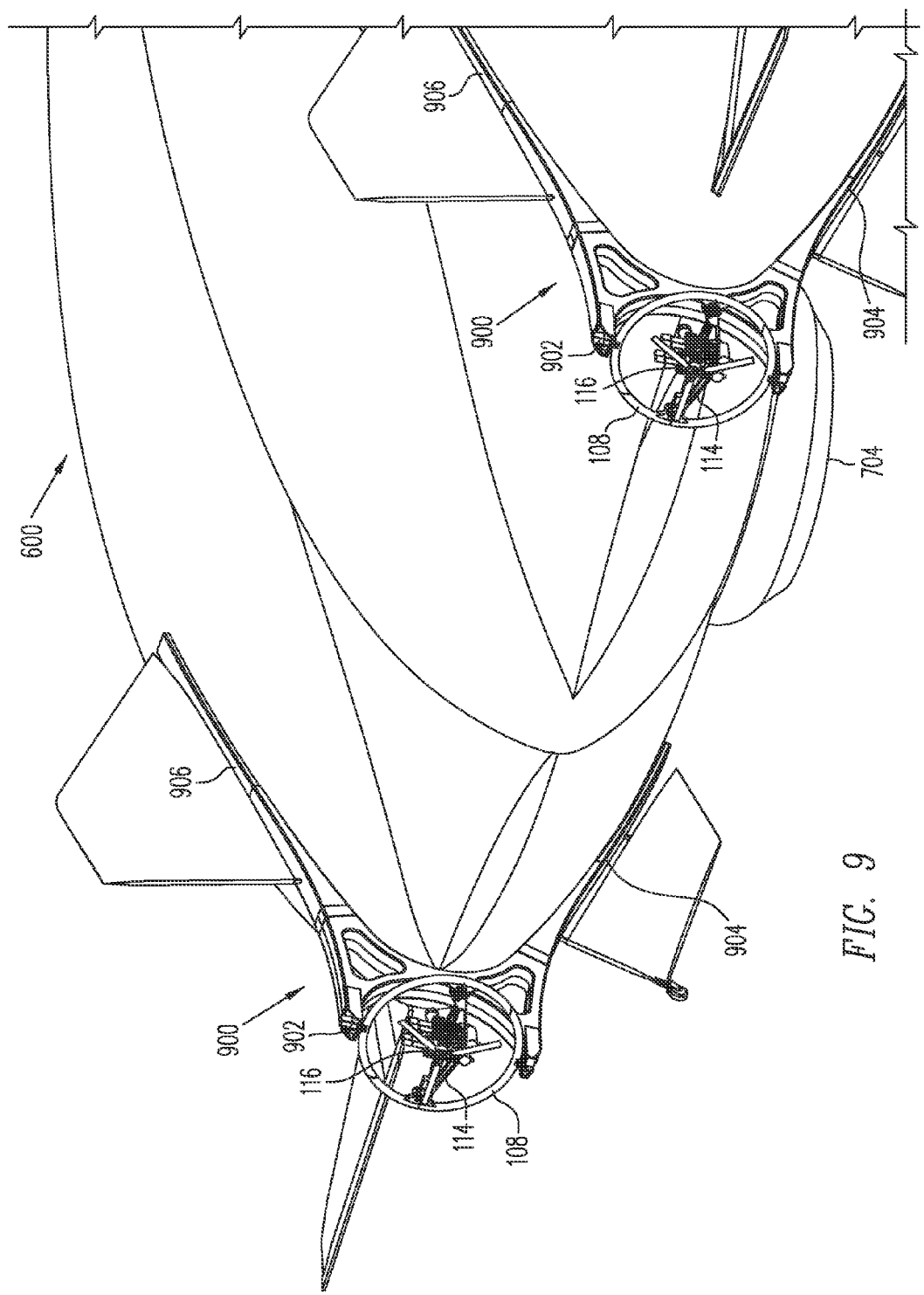
FIG. 9 is an aft view of the hybrid air vehicle including another embodiment of gimbaled truss assemblies.

FIG. 9 is an aft perspective view of hybrid air vehicle 600 including another embodiment of gimbaled truss assemblies 900. Gimbaled truss assembly 900 is shown including gimbal mount 902 and a plurality of braces 904, 906 coupled to or formed integrally with gimbal mount 902. Braces 904, 906 are attached to an external portion of air vehicle 600. Circular frame 108 is rotatably mounted in gimbal mount 902 using a first set of diametrically opposed brackets included on the outer portion of the circular frame 108. Truss 114 is configured to retain a propulsion system 116 within circular frame 108 and is rotatably mounted to a second set of brackets included on the inner portion of the circular frame 108. Circular frame 108 has a diameter large enough to allow the propulsion system 116 and truss 114 to rotate at least 180 degrees through circular frame 108.

Gimbal mount 902 is configured to allow circular frame 108 to rotate at least 180 degrees within gimbal mount 902. A portion of gimbal mount 902 can be shaped to conform to the external surface of air vehicle 600. For example, in the embodiment shown, one side of gimbal mount 902 is C-shaped to allow rotation of frame 108, while another side of mount 902 is configured to conform to the parabolic shape of the aft end of air vehicle 600. Braces 904, 906 are coupled to or integral to the center portion of gimbal mount 108 and also typically conform to the outer contour of air vehicle 600. Braces 904, 906 are typically laced to air vehicle 600, however, any suitable method can be used to fasten braces 904, 906 to air vehicle 600.

Truss 114 and circular frame 108 can be rotated by actuators 128, 130, (FIG. 1) respectively. Accordingly, thrust alone, as opposed to wheels and or flight control surfaces such as rudders and elevators, is used to control air vehicle 600 on the ground and in flight. Mounting assemblies 100, 900 enable simultaneous propulsion and control of the air vehicle by using at least 180 degrees of vectored, differential thrust in pitch (nose up/down) and yaw (nose right/left) axes. The range of thrust vectoring provides a hemisphere of vectored propulsion and simultaneous control of air vehicle 600 without requiring forward movement of air vehicle 600.

Figure 10:
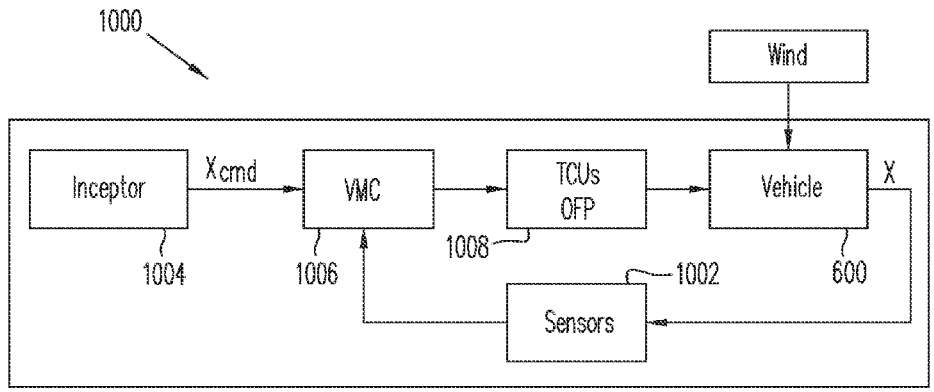
FIG. 10 shows a schematic of an embodiment of a control system for the hybrid air vehicle.

FIG. 10 shows a diagram of components included in an embodiment of a computerized closed-loop control system 1000 to maintain control over air vehicle 600 (FIG. 6). One or more automated control modes such as "Flight", "Ground Vector", and "Position Hold" can be included in the logic of control system 1000. Flight mode allows the vehicle to be flown by commanding body axis rates and attitudes. Ground Vector mode allows complex ground handling maneuvers to be accomplished. Position Hold mode allows the vehicle to hover in a stable position in the presence of variable winds. All of the control modes allow the vehicle to be controlled with a greatly reduced pilot workload.

Ground Vector control mode requires sensors 1002, inceptors 1004, and actuators 128, 130 (FIG. 1). A vehicle velocity command (direction and magnitude) can be input by the pilot via inceptors 1004. The feedback is implemented using sensors 1002 (e.g., GPS, INS, air data computer, pitot and static pressure, etc.) to measure the vehicle's velocity. Pilot inputs and sensor information are read by Vehicle Management Computer (VMC) 1006. Input conditioning, mode logic and fault detection are implemented in Thruster Control Unit (TCU) 1008. The VMC 1006 computes the forces and moments necessary to reduce the error between the commanded velocity/direction and the measured velocity/direction. The forces and moments are then converted into thrust vector commands for the vehicle's propulsion system, and ultimately to command positions for actuators 128, 130 to rotate truss 114 and circular frame 108. The pilot can provide manual input via a control stick to update the velocity command as required to maintain a desired ground track and speed. Autopilot modes can also be implemented to provide updated command inputs without requiring pilot input.

Figure 11:
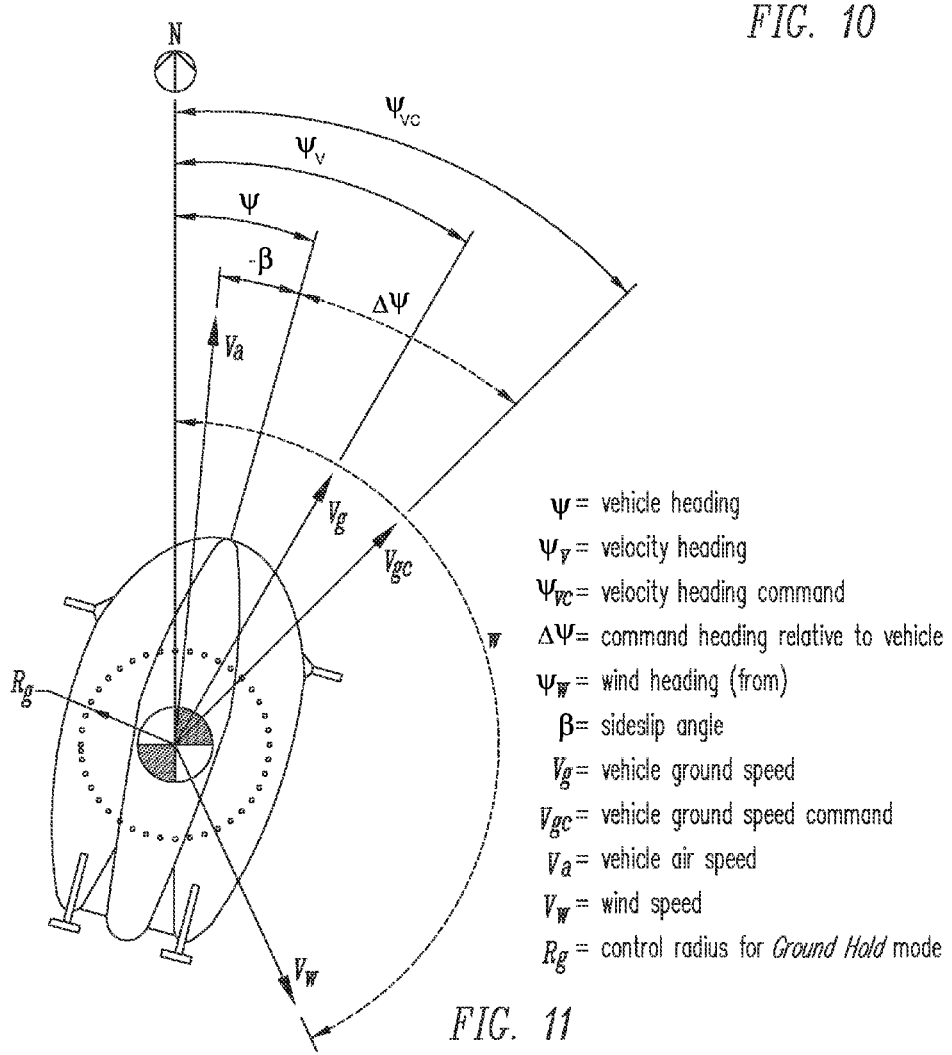
FIG. 11 shows some terminology related vehicle and wind headings.

Control variable notation for control system 1000 is shown in FIG. 11. The vehicle's ground velocity vector has a magnitude of Vg and a direction of $\psi_v$ that are measured by a sensor such as a GPS or INS. The velocity vector command is input by the pilot using cockpit inceptors or via a computer-implemented autopilot. Control system 1000 calculates the error between the commanded and measured ground velocities and then calculates the forces and moments necessary to drive the error toward zero. These forces and moments are then converted to commands for actuators 128, 130 to rotate truss 114 and circular frame 108 to create appropriate thrust vectors. The vehicle response is continuously measured and the commands are modulated to achieve the desired position/velocity and maintain control of vehicle 600. An air data sensor or other suitable sensor can be used to measure the vehicle's airspeed. The sideslip angle and yaw rate can be computed and monitored by VMC 1006. Control system 1000 can further blend between yaw rate and sideslip angle commands based on the airspeed of vehicle 600.

The components of control system 1000 used to implement a Position Hold mode are similar to those used for Ground Vector mode. Rather than a vehicle velocity command, a location command is input by the pilot and/or an autopilot. The deviation between the commanded vehicle location and the actual location, as measured by a suitable sensor, is used by VMC 1006 to calculate a vehicle velocity command to drive the position error towards zero. The velocity loop is then used to drive the velocity command to zero, which in turn will maintain the vehicle's location at the commanded point.

Flight mode can be implemented for use during takeoff, flight and landing maneuvers. Vehicle rates and pitch attitude are controlled by VMC 1006. Roll, pitch and yaw are measured by a suitable sensor, such as a GPS/INS sensor. Airspeed can be measured by an air data sensor. The vehicle's natural roll stability is supplemented by the VMC 1006. Yaw rate and sideslip feedback loops can be used to control to vehicle's heading. The pitch attitude can be controlled using a rate command with an attitude hold. In addition to the vehicle rotations (i.e., roll, pitch and yaw), vertical and axial thrust commands are used to control the longitudinal axes.

The logic modules, processing systems, and circuitry described here may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger, smaller, or different software modules, integrated circuits, or electrical assemblies, if desired. VMC 1006 and TCU 1008 can be implemented in logic that can be executed by any suitable computer-processing device that includes memory for storing and executing logic instructions, and capable of interfacing with other processing systems.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Additionally, although a two cycle reciprocating engine with a propeller has been disclosed in various embodiments, other suitable propulsion systems can be used in addition to, or instead of, an engine and propeller. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

We claim:

1. An apparatus comprising:
    a propulsion system mount assembly including:
        a gimbal mount;
        a plurality of braces directly coupled to the gimbal mount, wherein the braces are attachable to an external portion of an air vehicle;
        a circular frame;
        a first set of diametrically opposed brackets on the outer portion of the circular frame;
        a second set of diametrically opposed brackets on the inner portion of the circular frame, wherein the circular frame is mounted to the gimbal mount at the first set of brackets to rotate approximately 180 degrees; and
        a truss configured to retain a propulsion system within the circular frame, wherein the truss is rotatably mounted to the second set of brackets and the circular frame has a diameter large enough to allow the propulsion system and truss to rotate approximately 180 degrees through the circular frame, and members on one side of the truss are staggered to extend —further—past—the axis of rotation of the truss than—members on an opposing side of the truss.

2. The apparatus of claim 1, wherein the gimbal mount is C-shaped to allow the circular frame to rotate at least 180 degrees within the gimbal mount.

3. The apparatus of claim 2, further comprising:
    pairs of arms attached to ends of the gimbal mount, the arms of each pair extending at angle to one another and;
    two of the braces are positioned along a flattened central portion of the gimbal mount; and
    two other of the braces extend past the gimbal mount and are attached to a respective pair of the arms.

4. The apparatus of claim 1 wherein the braces conform to the outer contour of the air vehicle.

5. The apparatus of claim 1, wherein the gimbal mount includes end portions and further comprising:
    a second plurality of braces; and
    a first set of arms attached to one of the second braces and one of the end portions of the gimbal mount.

6. The apparatus of claim 5 wherein the first set of arms are attached to form sides of a triangle, with a corresponding one of the second braces forming the base of the triangle.

7. The apparatus of claim 5, wherein the gimbal mount includes end portions and further comprising:
    a second set of arms attached to another one of the second braces and another one of the end portions of the gimbal mount.

8. The apparatus of claim 7 wherein the second set of arms are attached to form sides of a triangle, with the another one of the second braces forming the base of the triangle.

9. The apparatus of claim 1, wherein the braces extend past the width of the gimbal mount.

10. The apparatus of claim 1, further comprising a first actuator coupled to rotate the truss in response to electronic command signals from an automated control system.

11. The apparatus of claim 10, further comprising a second actuator coupled to rotate the circular frame in response to electronic command signals from an automated control system.

12. The apparatus of claim 1, further comprising:
    bearing assemblies coupled between ends of the truss and the second set of brackets, wherein the bearing assemblies enable rotational motion of the truss.

13. The apparatus of claim 1, further comprising:
bearing assemblies coupled between diagonally opposite portions of the circular frame and the first set of brackets, wherein the bearing assemblies enable rotational motion of the circular frame.

14. The apparatus of claim 1, further comprising:
an exhaust system coupled to the propulsion system, wherein the propulsion system is coupled to one side of the truss and the truss is positioned between the propulsion system and at least a portion of the exhaust system.

15. The apparatus of claim 1, further comprising:
a plurality of propulsion system mount assemblies, wherein a first propulsion system mount assembly is attached to one side of the air vehicle and a second propulsion system mount assembly is attached to another side of the air vehicle.

16. The apparatus of claim 1, further comprising:
a plurality of propulsion system mount assemblies, wherein a first propulsion system mount assembly is attached to one side of the rear of the air vehicle and a second propulsion system mount assembly is attached to another side of the rear of the air vehicle.

17. The apparatus of claim 1, wherein the propulsion system includes a reciprocating engine and a propeller.

18. The apparatus of claim 1, wherein:
the braces are laced to the air vehicle.

19. The apparatus of claim 1, further comprising:
the air vehicle, wherein the air vehicle includes a lighter-than-air hull with an aerodynamic lift-inducing shape.

20. The apparatus of claim 1, wherein:
one of the braces is configured to conform to an upper aft end of the air vehicle; and
another one of the braces is configured to conform to a lower aft end of the air vehicle.

21. The apparatus of claim 1, wherein:
the air vehicle includes an aft end, and a portion of the gimbal mount is configured to conform to the aft end of the air vehicle.

22. An apparatus comprising:
a gimbaled truss assembly including:
a frame rotatably mounted in a gimbal mount;
a truss rotatably mounted within the frame, wherein the truss is configured to retain a propulsion system and the frame and the truss rotate independently of one another, the truss is asymmetrical about the axis of rotation of the truss;
a fastening system for mounting the propulsion system to the truss, wherein the fastening system includes vibration isolators; and
a plurality of braces directly coupled to the gimbal mount, wherein the braces conform to the external surface of a vehicle on which the assembly is to be attached.

23. The apparatus of claim 22, further comprising:
a propulsion system mounted in the center of one side the truss; and
mufflers mounted on another side of truss with manifolds connecting the mufflers to the exhaust ports of the propulsion system.

24. The apparatus of claim 22, wherein:
the diameter of the frame is larger than the diameter of a propeller on the propulsion system.

25. The apparatus of claim 22, wherein:
the truss includes a central three-dimensional rectangular framework with crisscrossed braces to add stiffness and strength.

26. The apparatus of claim 25, wherein:
the truss includes three-dimensional elongated, tapered trapezoidal frameworks configured on two opposing sides of the central three-dimensional rectangular framework, wherein the trapezoidal frameworks include cross braces to add strength and stiffness to the truss.

27. The apparatus of claim 22, wherein:
one side of the truss is staggered from another side of the truss.

28. The apparatus of claim 22, further comprising:
an air vehicle, wherein the gimbaled truss assembly is fastened on an external surface of the air vehicle; and
a computerized control system operable to compute error between commanded velocity/direction of the air vehicle and measured velocity/direction of the air vehicle, and convert the error into thrust vector command position signals for actuators to rotate the truss and the frame.

29. The apparatus of claim 28, wherein:
the control system is operable in a Ground Vector control mode to maintain a desired ground track and speed, a Position Hold mode to hover the air vehicle in a stable position in the presence of variable winds, and a Flight mode that allows the air vehicle to be flown by commanding body axis rates and attitudes.

30. An apparatus comprising:
a lighter-than-air vehicle including two side lobes coupled to a central lobe, wherein the shape of the side and central lobes are aerodynamically lift-inducing;
a first gimbaled truss assembly mounted externally to one of the side lobes;
a second gimbaled truss assembly mounted externally to another of the side lobes;
third and fourth gimbaled truss assemblies mounted externally to respective aft ends of the side lobes;
first, second, third, and fourth frames rotatably mounted in respective first, second, third, and fourth gimbaled truss assemblies;
a truss rotatably mounted in each of the frames, wherein the frames rotate independently of the trusses; and
a plurality of propulsion systems, one of the propulsion systems mounted on top of a respective one of the trusses.

* * * * *